United States Patent
Ton

(10) Patent No.: US 9,534,729 B2
(45) Date of Patent: Jan. 3, 2017

(54) TRAY DEVICES WITH MULTIMEDIA HOLDERS

(71) Applicant: Quy That Ton, Baton Rouge, LA (US)

(72) Inventor: Quy That Ton, Baton Rouge, LA (US)

(73) Assignee: Quy That Ton, Baton Rouge, LA (US)

( * ) Notice: Subject to any disclaimer, the term of this patent is extended or adjusted under 35 U.S.C. 154(b) by 17 days.

(21) Appl. No.: 14/201,757

(22) Filed: Mar. 7, 2014

(65) Prior Publication Data

US 2014/0252812 A1   Sep. 11, 2014

Related U.S. Application Data

(60) Provisional application No. 61/774,566, filed on Mar. 7, 2013.

(51) Int. Cl.

| | | |
|---|---|---|
| *A47C 7/70* | (2006.01) | |
| *F16M 11/06* | (2006.01) | |
| *A47C 1/11* | (2006.01) | |
| *F16M 11/08* | (2006.01) | |
| *F16M 11/20* | (2006.01) | |
| *F16M 11/40* | (2006.01) | |
| *A47C 7/68* | (2006.01) | |
| *A47B 83/02* | (2006.01) | |

(52) U.S. Cl.
CPC .............. *F16M 11/06* (2013.01); *A47C 1/11* (2013.01); *F16M 11/08* (2013.01); *F16M 11/2014* (2013.01); *F16M 11/40* (2013.01); *A47B 83/02* (2013.01); *A47C 7/68* (2013.01); *A47C 7/70* (2013.01)

(58) Field of Classification Search
CPC .............. A47C 7/70; A47C 7/68; A47B 83/02
USPC ................... 297/170, 160, 162, 161, 173
See application file for complete search history.

(56) References Cited

U.S. PATENT DOCUMENTS

| | | | | |
|---|---|---|---|---|
| 564,044 | A * | 7/1896 | Berkemeyer | ................ 297/170 |
| 4,569,498 | A * | 2/1986 | Ermanski | .................. 248/441.1 |
| 5,845,964 | A * | 12/1998 | Phoon | ..................... A47C 7/70 |
| | | | | 297/162 |
| 6,220,658 | B1 * | 4/2001 | Lukawski | ................ A47C 7/70 |
| | | | | 297/145 |
| 7,478,867 | B2 * | 1/2009 | Weng | ............................ 297/161 |
| 8,696,056 | B2 * | 4/2014 | Corcorran et al. | ........... 297/170 |
| 8,985,684 | B2 * | 3/2015 | Zheng | .................. B64D 11/00 |
| | | | | 297/161 |

FOREIGN PATENT DOCUMENTS

SG   WO 2012082071 A1 *   6/2012   ............ B64D 11/00

* cited by examiner

*Primary Examiner* — Syed A Islam
(74) *Attorney, Agent, or Firm* — Minh N. Nguyen

(57) ABSTRACT

A device having a tray and a multimedia holder is provided. A representative device comprises a base that is configured to couple to an arm rest of a chair; a tray arm that is mechanically coupled to the base at a distal end of the tray arm; a tray that is mechanically coupled to the tray arm at a proximal end of the tray arm; and a multimedia holder that is coupled to the distal end of the tray arm.

14 Claims, 4 Drawing Sheets

TRAY DEVICES WITH MULTIMEDIA HOLDERS

CROSS REFERENCE TO RELATED APPLICATIONS

This application claims the benefit of U.S. provisional application entitled, "VERSATILE TRAY DEVICES WITH IPAD HOLDERS," having Ser. No. 61/774,566, filed on Mar. 7, 2013, all of which are entirely incorporated herein by reference.

TECHNICAL FIELD

The present disclosure is generally related to trays and multimedia holders and methods of use thereof and, more particularly, is related to tray devices with multimedia holders that are attached to pedicure spa apparatus.

SUMMARY

A device having a tray and a multimedia holder is provided. A representative device comprises a base that is configured to couple to an arm rest of a chair; a tray arm that is mechanically coupled to the base at a distal end of the tray arm; a tray that is mechanically coupled to the tray arm at a proximal end of the tray arm; and a multimedia holder that is coupled to the distal end of the tray arm.

Other apparatuses, devices, methods, features of the invention will be or will become apparent to one skilled in the art upon examination of the following figures and detailed description. It is intended that all such apparatuses, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary apparatuses are first discussed with reference to the figures. Although these apparatuses are described in detail, they are provided for purposes of illustration only and various modifications are feasible.

Figure 1:
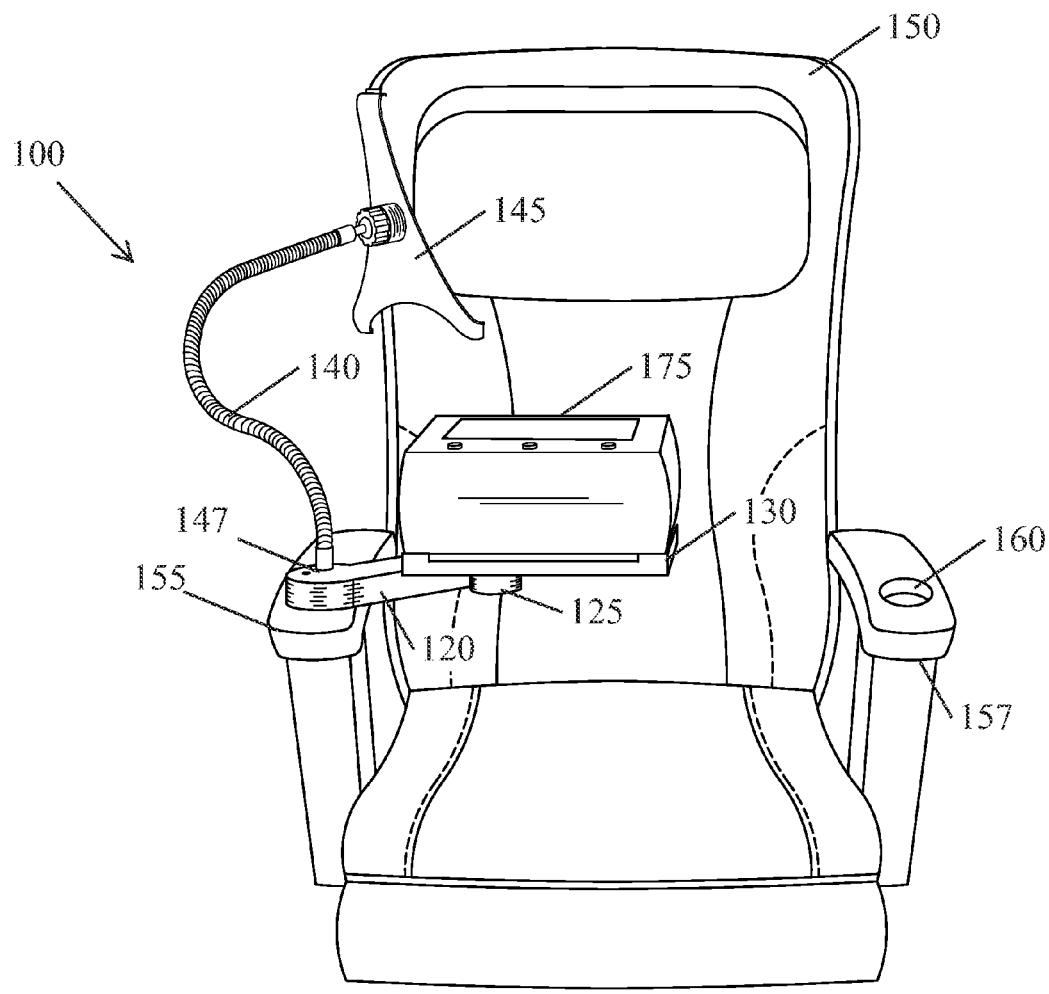
FIG. 1 is a perspective view of a chair that is attached to a device having a tray and a multimedia holder in accordance with an embodiment of the invention.

FIG. 1 is a perspective view of a chair 150 that is attached to a device 100 having a tray 130 and a multimedia holder 145 in accordance with an embodiment of the invention. The chair 150 can be placed on a pedicure spa (not shown). The chair 150 includes an arm rest 155 that is coupled to the device 100, which includes a tray 130 and a multimedia holder 145. The multimedia holder 145 can be designed to hold an electronic device (not shown), such as an iPad, Tablets, etc. The multimedia holder 145 is attached to a proximal end of a flexible coil 140 that can be bent into many shapes and many directions. The distal end of the flexible coil 140 includes threads that can be used to screw onto the distal end of the tray arm 120 via a thread hole 147 (FIG. 2).

The tray 130 can be design to have a nail drying device 175 for drying manicured finger nails, and other items that can be placed on top of the tray 130. The tray 130 is coupled to a tray arm 120 such that the tray 130 swivels on a horizontal plane. Similarly, the tray arm 120 is coupled to the arm rest 155 of the chair 150 such that the tray arm 120 swivels on a horizontal plane. The arm rest 155 of the chair 150 includes a recess 160 such that a base 105 (FIG. 2) fits therein, which facilitates coupling the tray am 120 to the arm rest 155. The base recess 160 has a bottom wall 157 that prevents the base from falling therethrough. The components and the assembly of the device 100 will be described in more detail in connection to FIG. 2.

Figure 2:
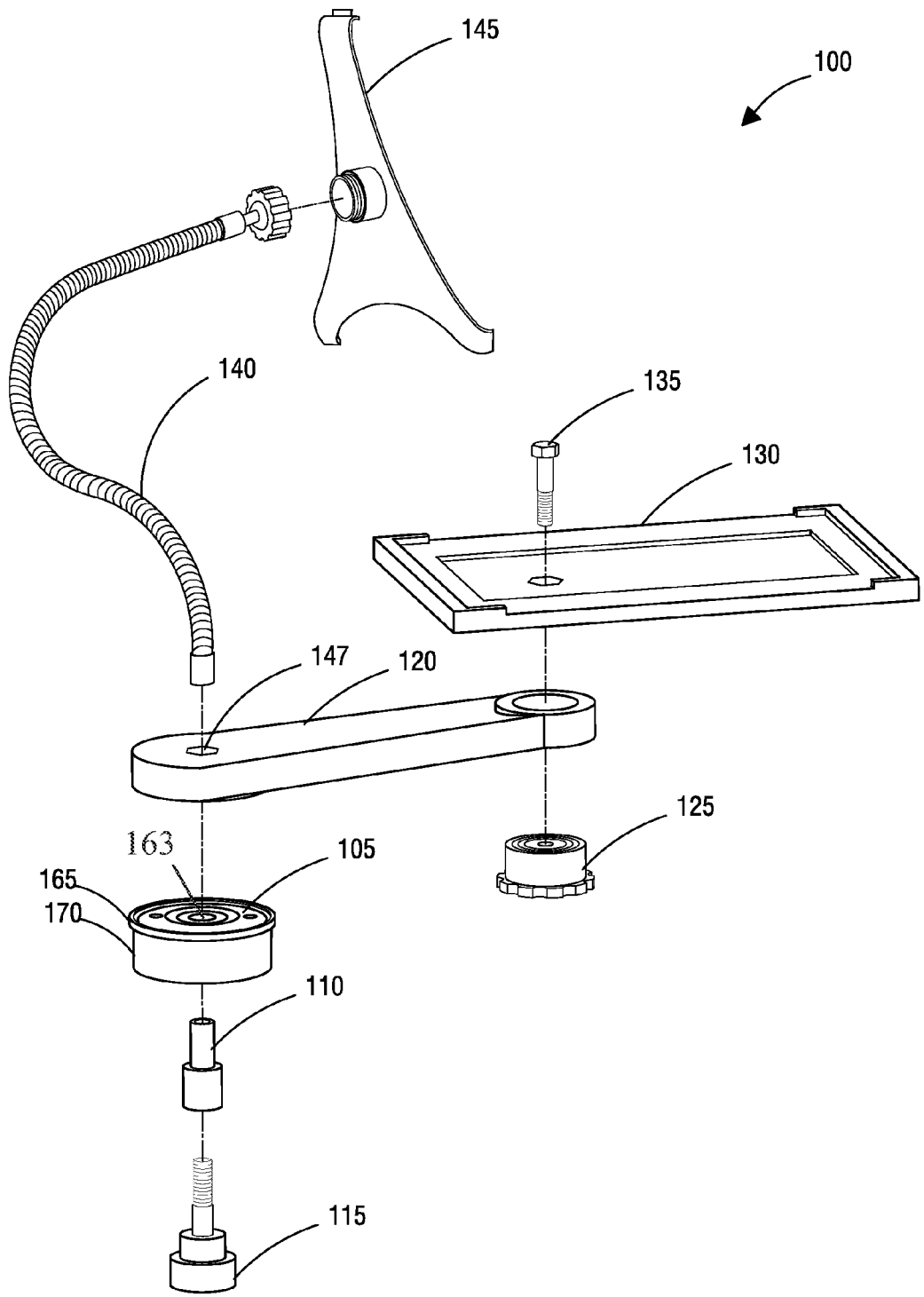
FIG. 2 is a preassembly view of a device having a tray and a multimedia holder, such as that shown in FIG. 1.

FIG. 2 is a preassembly view of a device 100 having a tray 130 and a multimedia holder 145, such as that shown in FIG. 1. The device 100 includes a base 105 that is mechanically coupled to a distal end of a tray arm 120 via a first screw 115 and a first swivel coupler 110. The proximal end of the tray arm 120 is mechanically coupled to a tray 130 via a second screw 135 and a second swivel coupler 125. The multimedia holder 145 is attached to a proximal end of a flexible coil 140 that can be bent into many shapes and many directions. The distal end of the flexible coil 140 includes threads that can be used to screw onto the distal end of the tray arm 120 via a thread hole 147.

The first swivel coupler 110 is inserted into a borehole 163 in the center of the base 105. The top edge of the base 105 includes an extension structure 165 that extends radially and horizontally from the side wall 170 of the base 105. The extension structure 165 is slightly larger in diameter than the base recess 160 to prevent the base 105 from sliding into the base recess 160 (FIG. 1).

The bottom wall of the base recess 160 (FIG. 1) includes a hole (not shown) such that the first screw 115 is inserted there through. The first swivel coupler 110 is an elongated rod with a borehole in the center of the rod and includes an extension structure at a proximal end of the first swivel coupler 110. The extension structure of the first swivel coupler 110 extends radially and horizontally from the side wall of the first swivel coupler 110, preventing the first swivel coupler 110 from sliding through the borehole in the center of the base 105 and the hole in the center of the base recess 160.

The first swivel coupler 110 is inserted into a borehole of the base 105 at the bottom end of the borehole and coupled to the tray arm 120 at the distal end of the tray arm 120. The first swivel coupler 110 is configured to enable the tray arm 120 to turn around the first swivel coupler 110. A first screw 115 is inserted at the bottom of the arm 155 through the hole in the center of the base recess 160, through the borehole of the first swivel coupler 110, and screws on to the tray arm 120 via the thread hole 147 of the tray arm 120.

A second swivel coupler 125 is inserted into a borehole of the tray arm 120 and coupled to the tray 130 at the proximal end of the tray arm 120. The second swivel coupler 125 is configured to enable the tray 130 to turn around the second swivel coupler 125. The second screw 135 is inserted from the top of the tray 130 to the bottom of the tray 130 through a hole of the tray 130. The second screw 135 is then inserted through a borehole at the proximal end of the tray arm 120 and mechanically couples the tray 130 and the tray arm 120 together using a second swivel coupler 125.

The second swivel coupler 125 includes a thread hole in the center of the second swivel coupler 125 where the second screw 135 screws to. The top edge of the second swivel coupler 125 includes an extension structure 127 that extends radially and horizontally from the side wall 128 of the second swivel coupler 125. The extension structure 127 is slightly larger in diameter than the borehole at the proximal end of the tray arm 120 to prevent the second swivel coupler 125 from sliding through the borehole of the tray arm 120. A proximal end (having threads) of the flexible coil 140 is screwed onto the distal end of the tray arm 120 via the thread hole 147. The multimedia holder 145 is attached to the flexible coil at the distal end of the flexible coil. The nail dryer 175 can be placed on top of the tray 130.

Figure 3:
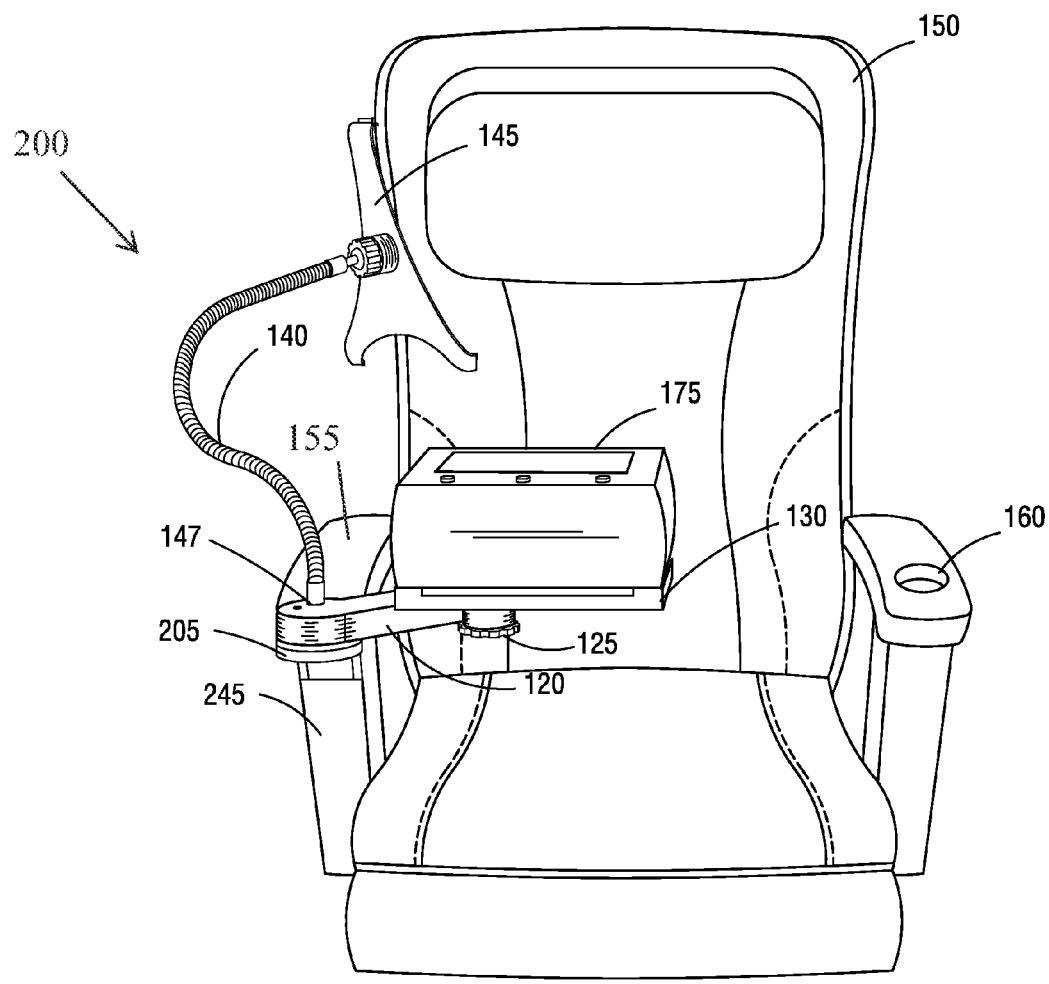
FIG. 3 is a perspective view of a device having a tray and a multimedia holder in accordance with another embodiment of the invention.

FIG. 3 is a perspective view of a device 200 having a tray 130 and a multimedia holder 145 in accordance with another embodiment of the invention. In this example, the parts, architecture, and operation of the device 200 is similar to the parts, architecture, and operation of the device 100 as described in connection to FIGS. 1-2. Like features are labeled with the same reference numbers, such as the tray arm 120, second swivel coupler 125, second screw 135, flexible coil 140, multimedia holder 145 and tray 130. The difference between the devices 100, 200 is that the device 200 is coupled to the chair 150 using a bracket 205, which in this example, is placed at a front edge of the arm rest 155 of the chair 150. The device 200 is further described in more detail in connection to FIG. 4.

Figure 4:
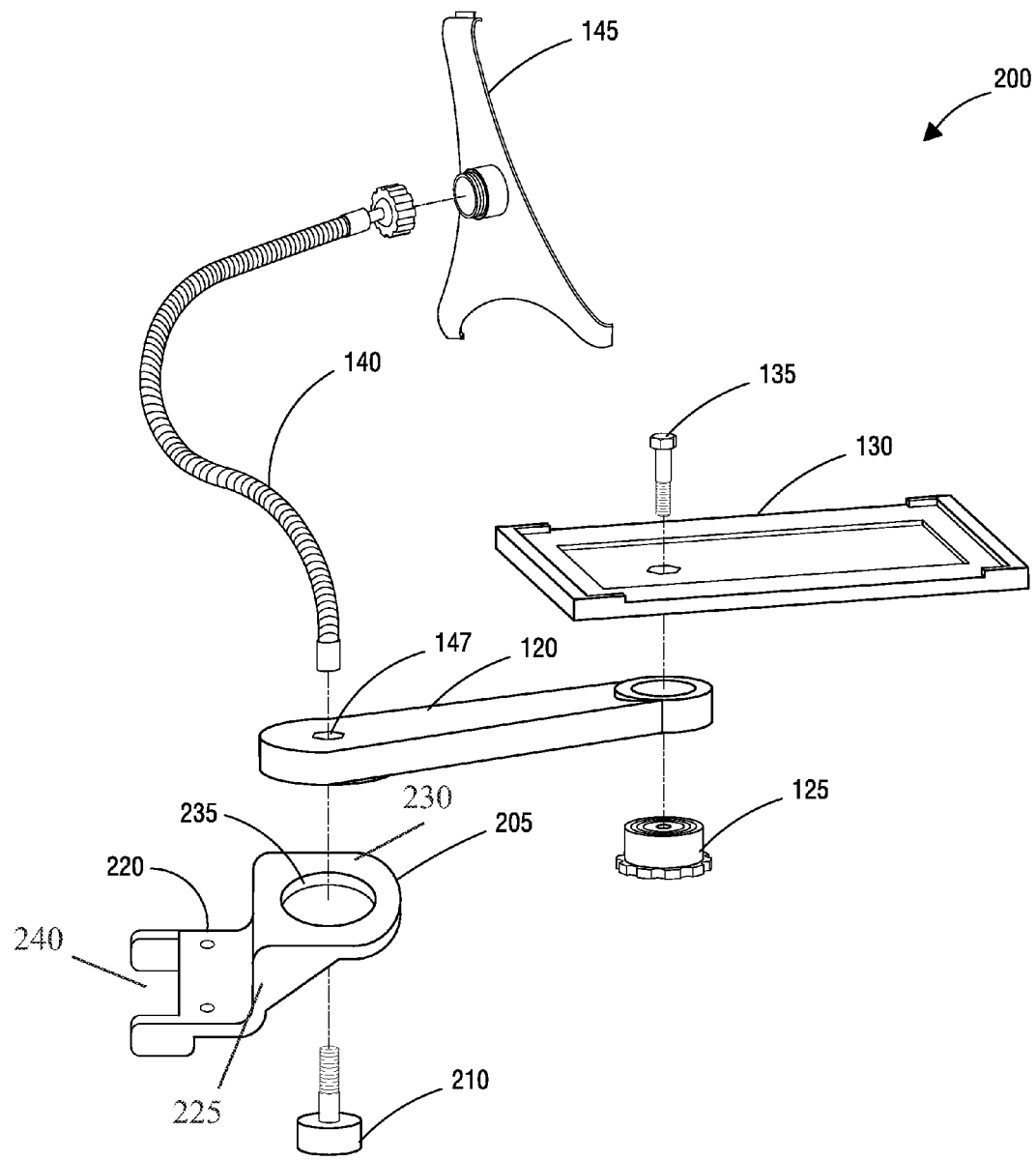
FIG. 4 is a preassembly view of a device having a tray and a multimedia holder, such as that shown in FIG. 3.

FIG. 4 is a preassembly view of a device 200 having a tray 130 and a multimedia holder 145, such as that shown in FIG. 3. The bracket 205 is shaped similarly to a letter "S" from a side view of the bracket 205. The bracket 205 includes a base 220 that includes a "U" shaped structure 240, a middle section 225 that is attached to the base and extends substantially upward and perpendicular to the base 220, and an extension section 230 that is attached to the middle section 225 and radially extends substantially away and perpendicular to the base 220. In this example, the bracket 205 is made of metal but can be any materials that hold the versatile tray device 200, such as carbon fiber, plastic, etc.

The base 220 and middle section 225 of the bracket 205 can be placed underneath and in front the arm rest 155 (FIG. 3) of the pedicure spa chair 150 (FIG. 3), respectively. The bracket 205 is attached to the arm 155 at the base 220 of the bracket 205 using screws. The extension section 230 is substantially parallel to the top surface of the arm 155.

The "U" shaped portion 240 wraps around an arm support structure 245 of the pedicure spa chair 250, which facilitates preventing the bracket 205 from moving out of position once screwed on to the arm 155. The distal end of the tray arm 120 is mechanically coupled to the bracket 205 at the extension section 230 through the hole 235 of the bracket 205 using the screw 210 that screws onto the thread hole 147 of the tray arm 120. The remainder of the assembly of the device 200 is similar to the steps described in connection to the device 110, such as that shown in FIG. 2.

As described herein, the devices 100, 200 are disclosed utilizing the first swivel coupler 105 and bracket 205 to attach the devices 100, 200 to the arm rest 155 of the pedicure spa chair 150. The versatile tray devices 100, 200 are further attached to the multimedia holder 145, which allows for a patron having manicure and pedicure services in a beauty salon, to perform at least two activities at the same time, for example, 1) dry their hands with the nail dryer 175 that is placed on top of the tray 130 and 2) interact with, for example, an iPad attached to the multimedia holder 145.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A device comprising:
    an arm rest of a chair having a top wall and a front wall, wherein the top wall having a base recess;
    a base that is configured to couple to the arm rest of the chair on a top surface of the top wall and adjacent to the front wall of the arm rest, wherein a top edge of the base includes an extension structure that extends radially and horizontally from a side wall of the base, wherein the extension structure is slightly larger in diameter than the base recess of the arm rest of the chair, wherein the base is placed into the base recess and the extension structure rests on a top edge of the base recess, wherein the base includes a borehole in the center of the base;
    a tray arm that is mechanically coupled to the base at a distal end of the tray arm;
    a tray that is mechanically coupled to the tray arm at a proximal end of the tray arm;
    a multimedia holder that is coupled to the distal end of the tray arm;
    a first swivel coupler is an elongated rod with a borehole in the center of the rod and includes an extension structure at a proximal end of the first swivel coupler, wherein the extension structure of the first swivel coupler extends radially and horizontally from the side wall of the first swivel coupler, preventing the first swivel coupler from sliding through the borehole in the center of the base, wherein the first swivel coupler is inserted into a borehole of the base at the bottom end of the borehole and coupled to the tray arm at the distal end of the tray arm, wherein the first swivel coupler is configured to enable the tray arm to turn around the first swivel coupler; and
    an attachment device that is inserted at the bottom of the arm rest through the hole in the center of the base recess, through the borehole of the first swivel coupler, and attaches to the tray arm, wherein the tray arm swivels along the plane of the top surface of the top wall of the arm rest.

2. The device as defined in claim 1, further comprising a flexible coil that is attached to the multimedia holder and the tray arm at a proximal end and a distal end of the flexible coil, respectively.

3. The device as defined in claim 1, wherein the base has a cylindrical shape that fits in a base recess at the arm of the chair, wherein the base recess has a bottom wall that prevents the base from falling through.

4. The device as defined in claim 1, further comprising a first swivel coupler that is inserted into a borehole of the base and coupled to the tray arm at the distal end of the tray arm, wherein the first swivel coupler is configured to enable the tray arm to turn around the first swivel coupler.

5. The device as defined in claim 1, further comprising a second swivel coupler that is inserted into a borehole of the tray arm and coupled to the tray at the proximal end of the tray arm, wherein the second swivel coupler is configured to enable the tray to turn around the second swivel coupler.

6. A chair comprising:
    at least one arm rest having a top wall and a front wall, wherein the top wall having a base recess;
    a base that is configured to couple to the at least one arm rest on a top surface of the top wall and adjacent to the front wall of the arm rest, wherein a top edge of the base includes an extension structure that extends radially and horizontally from a side wall of the base, wherein the extension structure is slightly larger in diameter than a base recess of the arm rest of the chair, wherein the base is placed into the base recess and the extension structure rests on a top edge of the base recess, wherein the base includes a borehole in the center of the base;
    a tray arm that is mechanically coupled to the base at a distal end of the tray arm;
    a tray that is mechanically coupled to the tray arm at a proximal end of the tray arm;
    a multimedia holder that is coupled to the distal end of the tray arm;
    a first swivel coupler is an elongated rod with a borehole in the center of the rod and includes an extension structure at a proximal end of the first swivel coupler, wherein the extension structure of the first swivel coupler extends radially and horizontally from the side wall of the first swivel coupler, preventing the first swivel coupler 110 from sliding through the borehole in the center of the base, wherein the first swivel coupler is inserted into a borehole of the base at the bottom end of the borehole and coupled to the tray arm at the distal end of the tray arm, wherein the first swivel coupler is configured to enable the tray arm to turn around the first swivel coupler; and
    a first screw is inserted at the bottom of the arm rest through the hole in the center of the base recess, through the borehole of the first swivel coupler, and screws on to the tray arm via a thread hole of the tray arm, wherein the tray arm swivels along the plane of the top surface of the top wall of the arm rest.

7. The tray as defined in claim 6, further comprising a flexible coil that is attached to the multimedia holder and the tray arm at a proximal end and a distal end of the flexible coil, respectively.

8. The tray as defined in claim 6, wherein the base has a cylindrical shape that fits in a recess at the arm of the chair, wherein the base recess has a bottom wall that prevents the base from falling through.

9. The tray as defined in claim 6, further comprising a first swivel coupler that is inserted into a borehole of the base and coupled to the tray arm at the distal end of the tray arm, wherein the first swivel coupler is configured to enable the tray arm to turn around the first swivel coupler.

10. The tray as defined in claim 6, further comprising a second swivel coupler that is inserted into a borehole of the tray arm and coupled to the tray at the proximal end of the tray arm, wherein the second swivel coupler is configured to enable the tray to turn around the second swivel coupler.

11. A device comprising:
    a bracket that is configured to attach to a front edge of an arm rest of a chair, wherein the bracket includes a top wall, a front wall, and a hole that is disposed at the front wall;
    a tray arm that is mechanically coupled to the bracket at a distal end of the tray arm;
    a tray that is mechanically coupled to the tray arm at a proximal end of the tray arm;
    a multimedia holder that is coupled to the distal end of the tray arm; and
    a first swivel coupler is an elongated thread rod and includes an extension structure at a proximal end of the first swivel coupler, wherein the extension structure of the first swivel coupler extends radially and horizontally from the side wall of the first swivel coupler, preventing the first swivel coupler from sliding through the hole of the bracket, wherein the first swivel coupler is inserted through the hole of the bracket and screws on a bottom of the tray arm at the distal end of the tray arm, wherein the first swivel coupler is configured to enable the tray arm to turn around the first swivel coupler, wherein the tray arm swivels along the plane of a top surface of the top wall of the bracket.

12. The device as defined in claim 11, further comprising a flexible coil that is attached to the multimedia holder and the tray arm at a proximal end and a distal end of the flexible coil, respectively.

13. The device as defined in claim 11, wherein the bracket is shaped similarly to a letter "S" from a side view of the bracket, wherein the bracket includes a base that includes a "U" shaped structure, a middle section that is attached to the base and extends substantially upward and perpendicular to the base, and an extension section that is attached to the middle section and radially extends substantially away and perpendicular to the base.

14. The device as defined in claim 11, further comprising a second swivel coupler that is inserted into a borehole of the tray arm and coupled to the tray at the proximal end of the tray arm, wherein the second swivel coupler is configured to enable the tray to turn around the second swivel coupler.

* * * * *